UNITED STATES PATENT OFFICE.

THOMAS ROUSE AND HERRMANN COHN, OF LONDON, ENGLAND.

MANUFACTURE OF BRIQUET FUEL FROM COAL-MINE WASTE OR DUST-COAL.

No. 806,845.     Specification of Letters Patent.     Patented Dec. 12, 1905.

Application filed May 16, 1905. Serial No. 260,721.

*To all whom it may concern:*

Be it known that we, THOMAS ROUSE, residing at 7 Oldhill street, Stamford Hill, and HERRMANN COHN, residing at 7 Brunswick Square, St. Pancras, London, in the county of Middlesex, England, British subjects, have invented new and useful Improvements in the Manufacture of Briquet-Fuel from Coal-Mine Waste or Dust-Coal, of which the following is a specification.

The coal dust or waste is ground to a powder and mixed with the hereinafter-mentioned binding solution, either with or without the addition of a small quantity of iron-furnace-flue cinder or some similar waste product containing silicate of iron, which is sometimes employed to delay or prolong the period of combustion of the fuel. A binding solution is prepared by mixing with four parts, by measure, of water-glass dissolved in about eighty measures of water, eighty-four measures in all, about one part, by measure, of a petroleum emulsion obtained by levigating caustic lime in petroleum until a cream is formed, to which cream a modicum of the hypophosphites of lime and soda may be added. The mixture is raised to boiling-point—212° Fahrenheit—by injecting steam, or in any other suitable way, and is then by such means diluted to a strength which suffices to make the coal-dust particles adhere during molding and pressing into briquet form. The petroleum emulsion causes a skin or glaze to be formed upon the briquets, which is protection against the action of the weather. The molded briquets may be dried in any suitable manner.

What we claim as our invention, and desire to secure by Letters Patent, is—

The process of agglomerating waste or coal-dust into briquets by means of a solution raised to the boiling-point consisting of one part of petroleum emulsion, obtained by levigating caustic lime in petroleum until a cream is formed and four parts of water-glass dissolved in eighty parts of water.

In testimony whereof we have subscribed our names to this specification in the presence of two subscribing witnesses.

THOMAS ROUSE.
HERRMANN COHN.

Witnesses:
   THOMAS WILKINS,
   DAVID J. MOCKRIDGE.